(12) United States Patent
Kim et al.

(10) Patent No.: US 11,344,836 B2
(45) Date of Patent: May 31, 2022

(54) POROUS FLUORINE RESIN FILM AND PREPARATION METHOD THEREOF

(71) Applicant: LG CHEM, LTD., Seoul (KR)

(72) Inventors: Sin Woo Kim, Daejeon (KR); Byeong In Ahn, Daejeon (KR); Hyun Seong Ko, Daejeon (KR); Seijung Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 349 days.

(21) Appl. No.: 16/628,601

(22) PCT Filed: Nov. 23, 2018

(86) PCT No.: PCT/KR2018/014549
§ 371 (c)(1),
(2) Date: Jan. 3, 2020

(87) PCT Pub. No.: WO2019/103537
PCT Pub. Date: May 31, 2019

(65) Prior Publication Data
US 2020/0147537 A1    May 14, 2020

(30) Foreign Application Priority Data

Nov. 24, 2017  (KR) .................. 10-2017-0158928
Nov. 22, 2018  (KR) .................. 10-2018-0145625

(51) Int. Cl.
*B01D 53/22*   (2006.01)
*B01D 46/02*   (2006.01)
(Continued)

(52) U.S. Cl.
CPC ............ *B01D 46/02* (2013.01); *B01D 69/02* (2013.01); *B01D 71/34* (2013.01); *B01D 71/36* (2013.01);
(Continued)

(58) Field of Classification Search
CPC .... B01D 71/36; B01D 2325/02; B01D 71/34; B01D 46/02; B01D 69/02; B01D 2323/46;
(Continued)

(56) References Cited

U.S. PATENT DOCUMENTS 6,143,675 A    11/2000 McCollam et al.
2003/0054155 A1    3/2003 Nomi et al.
(Continued)

FOREIGN PATENT DOCUMENTS

CN    1459392 A    12/2003
CN    1504498 A    6/2004
(Continued)

OTHER PUBLICATIONS

International Search Report and Written Opinion issued for PCT Application No. PCT/KR2018/014549 dated Mar. 7, 2019, 12 pages.
(Continued)

*Primary Examiner* — Anthony R Shumate
(74) *Attorney, Agent, or Firm* — Rothwell, Figg, Ernst & Manbeck, P.C.

(57) ABSTRACT

A porous fluorine resin film in which a fibril structure is stabilized through impregnation coating of a water-repellent and oil-repellent polymer having a high oil repellency grade, and free shrinkage also proceeds before impregnation and application of the water-repellent and oil-repellent polymer, thereby improving dimensional stability, and a method for preparing the porous fluorine resin film.

17 Claims, 4 Drawing Sheets

※ Comparative Example 1 to 3

MD stretched cloth    Heat set cloth    Oil repellent coating cloth

※ Example 1 to 3

MD stretched cloth    Heat set cloth    Freely shrunk cloth    Free shrinkage/ oil repellent coating cloth

(51) Int. Cl.
  *B01D 69/02* (2006.01)
  *B01D 71/34* (2006.01)
  *B01D 71/36* (2006.01)
  *C08J 5/24* (2006.01)
  *C08J 9/36* (2006.01)

(52) U.S. Cl.
  CPC ............ *C08J 5/24* (2013.01); *C08J 9/365* (2013.01); *B01D 2323/46* (2013.01); *B01D 2325/02* (2013.01); *C08J 2327/18* (2013.01); *C08J 2327/20* (2013.01)

(58) Field of Classification Search
  CPC .... C08J 2327/20; C08J 2327/18; C08J 9/365; C08J 5/24
  See application file for complete search history.

(56) References Cited

U.S. PATENT DOCUMENTS

| | | |
|---|---|---|
| 2003/0216119 A1 | 11/2003 | Mashiko et al. |
| 2004/0059717 A1 | 3/2004 | Klare et al. |
| 2005/0027063 A1 | 2/2005 | Audenaert et al. |
| 2005/0129851 A1 | 6/2005 | Klare et al. |
| 2005/0129925 A1 | 6/2005 | Klare et al. |
| 2005/0267241 A1 | 12/2005 | Sugimoto et al. |
| 2008/0076862 A1 | 3/2008 | Sugimoto et al. |
| 2009/0313813 A1* | 12/2009 | Sato ................ B01D 67/0088 29/623.5 |
| 2009/0325849 A1 | 12/2009 | Götz et al. |
| 2010/0210745 A1* | 8/2010 | McDaniel ................ C09D 7/48 521/55 |
| 2011/0236745 A1 | 9/2011 | Brant et al. |
| 2011/0250626 A1* | 10/2011 | Williams ................ C12Q 1/61 106/4 |
| 2012/0097194 A1* | 4/2012 | McDaniel ................ C09D 5/14 435/197 |
| 2013/0087042 A1 | 4/2013 | Furuyama et al. |
| 2013/0092623 A1* | 4/2013 | Tsujiwaki ................ B32B 3/26 210/490 |
| 2013/0108845 A1 | 5/2013 | Tee |
| 2015/0166820 A1 | 6/2015 | Ikeyama et al. |
| 2015/0217220 A1 | 8/2015 | Ikeyama et al. |
| 2015/0246319 A1 | 9/2015 | Furuyama et al. |
| 2016/0145369 A1* | 5/2016 | Ohmukai ................ B01D 69/06 525/60 |
| 2017/0266626 A1* | 9/2017 | Kayama ................ B01D 67/003 |
| 2020/0023322 A1* | 1/2020 | Hikita ................ C08L 27/12 |
| 2020/0061530 A1* | 2/2020 | Takemoto ................ B32B 27/08 |
| 2020/0164319 A1* | 5/2020 | Zhou ................ B01D 69/12 |
| 2020/0360862 A1* | 11/2020 | Kamimura ................ C08J 9/365 |
| 2020/0406184 A1* | 12/2020 | Kasahara ................ B01D 69/12 |
| 2021/0001280 A1* | 1/2021 | Inamoto ................ B01D 53/228 |

FOREIGN PATENT DOCUMENTS

| | | |
|---|---|---|
| CN | 1703481 A | 11/2005 |
| CN | 104437126 B | 7/2017 |
| CN | 107325238 A | 11/2017 |
| EP | 2881444 A1 | 7/2013 |
| JP | S58-059072 A | 4/1983 |
| JP | H06-269711 A | 9/1994 |
| JP | H09-052308 A | 2/1997 |
| JP | H11-506987 A | 6/1999 |
| JP | 2000-140531 A | 5/2000 |
| JP | 2001-315236 A | 11/2001 |
| JP | 2003-310304 A | 11/2003 |
| JP | 2006-500438 A | 1/2006 |
| JP | 2013-230671 A | 11/2013 |
| JP | 2014-042878 A | 3/2014 |
| KR | 10-2005-0055013 A | 6/2005 |
| KR | 10-2006-0128614 A | 12/2006 |
| KR | 10-2011-0101136 A | 9/2011 |
| KR | 10-2015-0106802 A | 9/2015 |
| KR | 10-2017-0121316 A | 11/2017 |
| WO | 1995-26881 A1 | 10/1995 |
| WO | 2014-021277 A1 | 2/2014 |

OTHER PUBLICATIONS

Extended European Search Report issued for European Patent Application No. 1880548.5 dated Jun. 29, 2020, 7 pages.

* cited by examiner

[FIG. 1]
※ Comparative Example 1 to 3
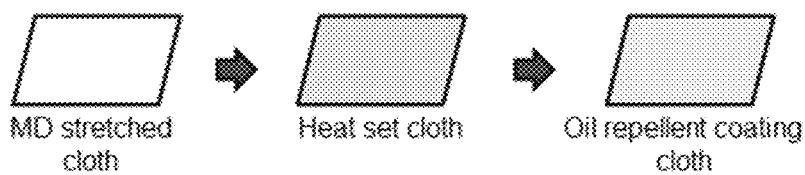
※ Example 1 to 3
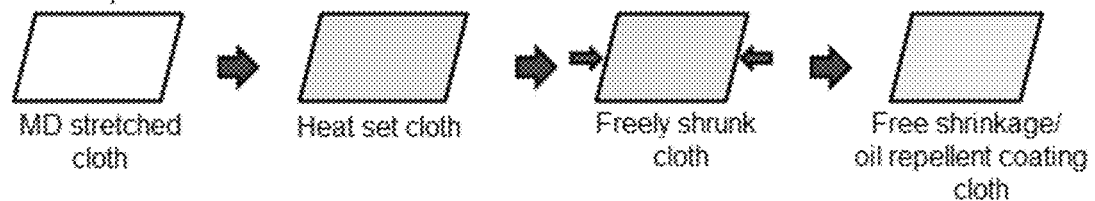

[FIG. 2]
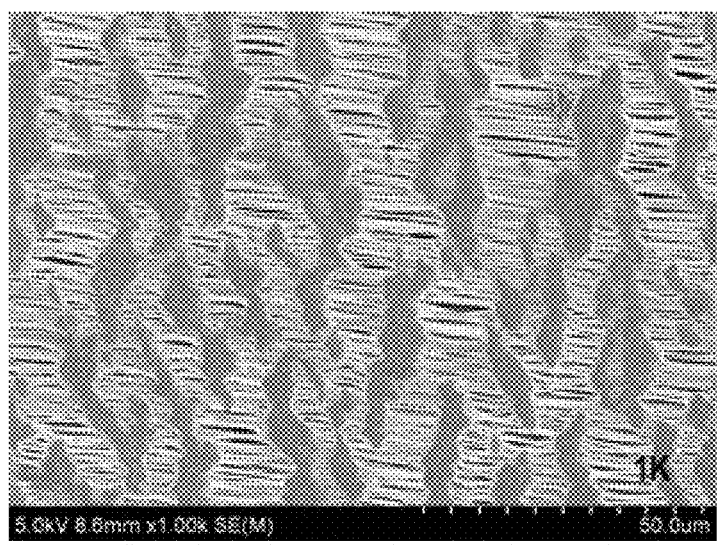
(a)
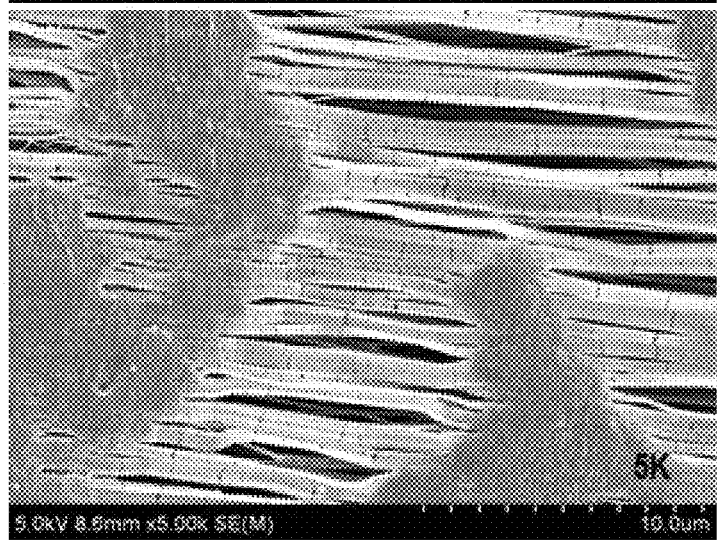
(b)

[FIG. 3]
- R = 2mm
19 mm vent 1.5 revolution level of curvature
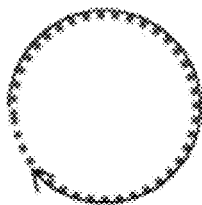
- R = 4mm
19 mm vent 0.8 revolution level of curvature
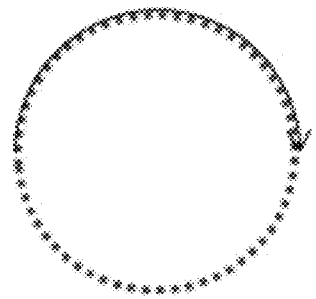
- R = 6mm
19 mm vent 0.5 revolution level of curvature

[FIG. 4]
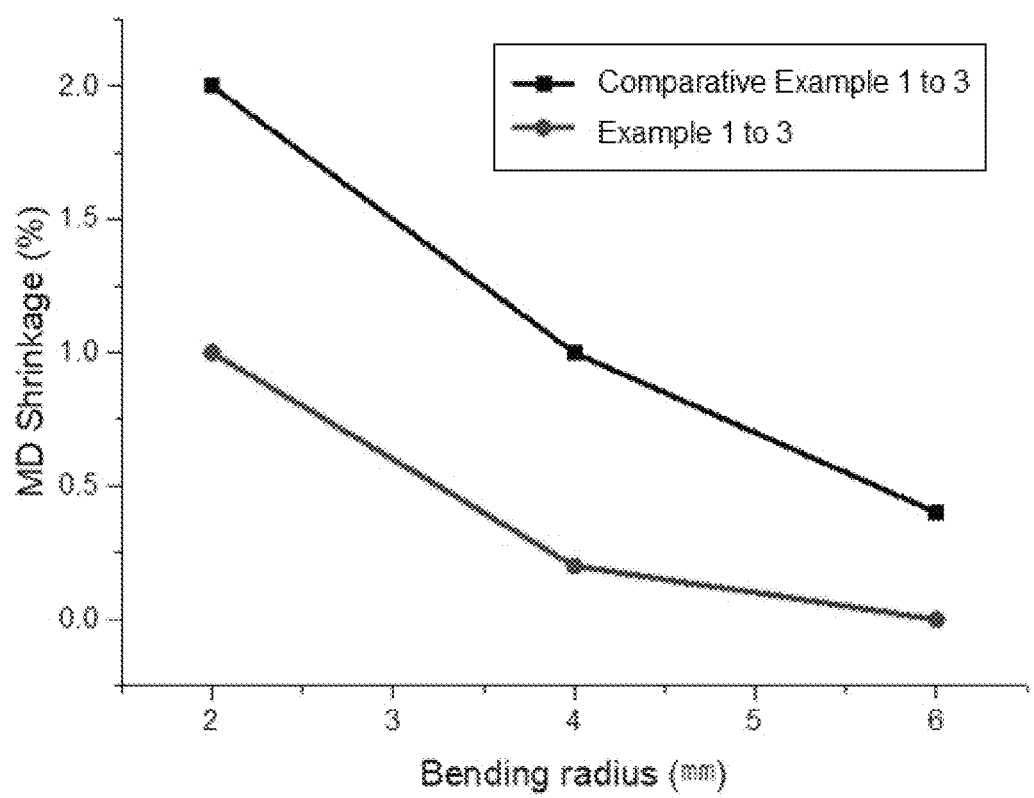

POROUS FLUORINE RESIN FILM AND PREPARATION METHOD THEREOF

CROSS-REFERENCE TO RELATED APPLICATION(S)

This application is a 35 U.S.C. § 371 National Phase Entry Application from PCT/KR2018/014549, filed on Nov. 23, 2018, and designating the United States, which claims the benefits of filing dates of Korean Patent Application No. 10-2017-0158928 filed with the Korean Intellectual Property Office on Nov. 24, 2017 and Korean Patent Application No. 10-2018-0145625 filed with the Korean Intellectual Property Office on Nov. 22, 2018, the entire contents of which are incorporated herein by reference.

TECHNICAL FIELD

The present invention relates to a porous fluorine resin film which is excellent in dimensional stability and has excellent water repellency and oil repellency even when subjected to severe bending, and a method for preparing the same.

BACKGROUND ART

A vent filter using a porous body is used for cases of various devices, and for example, it is mainly applied to electronic equipment for automobiles represented by lamps, motors, various sensors, and pressure switches.

The vent filter is also applied to mobile phones, cameras, electric razors, electric toothbrushes, outdoor lamps, and the like.

Such a vent filter has excellent air permeability and thus is mainly used for preventing deformation of an internal protection space depending on a pressure change and a surrounding environment. The vent filter is generally provided using a fluorine-based porous film. In the case of existing products, there is a problem that the dimensional stability under severe conditions is lowered.

The porous film has a fine structure composed of a plurality of fibrils (fine fibers) and a plurality of nodes (nodules) connected to each other by the fibrils, and is configured so that these fine structures are continuously connected.

However, when such a porous film is applied to a patch-type vent product, it will experience considerable bending in the process of attachment and handling, causing various problems.

That is, when the vent filter is applied to a patch-type product such as an automotive vent, excellent dimensional stability of the porous film is required.

For a patch-type vent product directly adhered by hand, it will experience considerable bending in the process of attachment and handling. The fluorine-based porous film used therein is not sufficiently stabilized, which causes shrinkage due to bending.

As the fluorine-based porous film is subjected to bending, shrinkage occurs. This may cause problems during the cutting operation, and the physical properties of the final product may change.

Accordingly, there is a need to develop a product having improved dimensional stability due to bending while maintaining the basic physical properties of the patch-type fluorine-based porous film.

DETAILED DESCRIPTION OF THE INVENTION

The present invention provides a porous fluorine resin film having excellent water repellency and oil repellency.

The present invention also provides a patch-type porous fluorine resin film in which the fibril structure is stabilized through impregnation coating of a water-repellent and oil-repellent polymer having a high oil repellency grade, and in which free shrinkage also proceeds before impregnation and application of the water-repellent and oil-repellent polymer, thereby improving dimensional stability, and a method for preparing the same.

The present invention provides a porous fluorine resin film including: a porous fluorine resin layer having pores formed therein; and a coating layer having water repellency and oil repellency which is formed on at least one surface of the porous fluorine resin layer and an outer surface of the pores, and includes a (co)polymer of a perfluoroalkyl acrylate having 1 to 10 carbon atoms—an alkyl acrylate having 1 to 10 carbon atoms—vinyl chloride—a crosslinkable monomer, wherein within a curvature radius of at least 2 mm, a change rate of air permeability represented by the following Equation 1 before and after bending to which bending is imparted is 1% or less:

$$\text{Change rate of air permeability before and after bending (\%)} = [(Pa-Pb)/Pa] \times 100 \qquad \text{[Equation 1]}$$

wherein, in the above Equation 1,

Pa is an air permeability value of a fluorine-based porous film measured before imparting bending, Pb is an air permeability value of a fluorine-based porous film measured after imparting bending to the fluorine-based porous film "under the condition of winding the fluorine-based porous film in a stainless steel cylinder having a diameter (R) of 4 mm to 12 mm in a state where a tension of 0.5 kgf is applied thereto, holding it for 30 seconds, then removing the tension and again spreading the fluorine-based porous film", and the air permeability value is measured by a Gurley method according to JIS P 8117.

The present invention also provides a method for preparing the porous fluorine resin film including the steps of: preparing a uniaxially stretched porous fluorine resin layer;

heat-setting the uniaxially stretched porous fluorine resin layer;

freely shrinking the heat-set porous fluorine resin layer at a temperature of at least 150° C. or higher; and impregnating the freely shrunk porous fluorine resin layer into a water-repellent and oil-repellent agent-containing solution diluted to a solid matter content of 2 to 10% by weight and drying it, wherein the water-repellent and oil-repellent agent includes a (co)polymer of a perfluoroalkyl acrylate having 1 to 10 carbon atoms—an alkyl acrylate having 1 to 10 carbon atoms—vinyl chloride—a crosslinkable monomer.

In addition, the present invention provides an automotive vent filter including the above-mentioned porous fluorine resin film.

Hereinafter, the porous fluorine resin film and the preparation method thereof according to a specific embodiment of the present invention will be described in more detail.

The technical terms used herein are for the purpose of describing exemplary embodiments only and are not intended to limit the scope of the invention.

The singular forms "a," "an", and "the" are also intended to include plural forms, unless the context clearly indicates otherwise.

It should be understood that the terms "comprise," "include", "have", etc. are used herein to specify the presence of stated features, numbers, steps, components, or combinations thereof, but do not preclude the presence or addition of one or more other features, numbers, steps, components, or combinations thereof.

Further, in the present invention, in a case where a layer or an element is mentioned to be formed "on" or "above" other layers or elements, it means that the layer or element is directly formed on the layers or elements, or it means that the other layers or elements may be additionally formed between layers or on a subject or substrate.

Since a variety of modifications may be made to the present invention and there may be various forms of the present invention, specific examples are illustrated and will be described in detail below.

However, it should be understood that this is not intended to limit the present invention to particular forms disclosed herein, and the invention compasses all modifications, equivalents, or alternatives falling within the spirit and technical scope of the present invention.

In the present invention, a (co)polymer refers to including both a polymer and a copolymer.

According to one embodiment of the present invention, a porous fluorine resin film can be provided, including: a porous fluorine resin layer having pores formed therein; and a coating layer having water repellency and oil repellency which is formed on at least one surface of the porous fluorine resin layer and an outer surface of the pores, and includes a (co)polymer of a perfluoroalkyl acrylate having 1 to 10 carbon atoms—an alkyl acrylate having 1 to 10 carbon atoms—vinyl chloride—a crosslinkable monomer, wherein within a curvature radius of at least 2 mm, a change rate of air permeability represented by the following Equation 1 before and after bending to which bending is imparted is 1% or less:

Change rate of air permeability before and after bending (%)=[(Pa−Pb)/Pa]×100    [Equation 1]

wherein, in the above Equation 1,

Pa is an air permeability value of a fluorine-based porous film measured before imparting bending, Pb is an air permeability value of a fluorine-based porous film measured after imparting bending to the fluorine-based porous film "under the condition of winding the fluorine-based porous film in a stainless steel cylinder having a diameter (R) of 4 mm to 12 mm in a state where a tension of 0.5 kgf is applied thereto, holding it for 30 seconds, then removing the tension and again spreading the fluorine-based porous film", and the air permeability value is measured by a Gurley method according to JIS P 8117.

In this case, in the specification of the present invention, the longitudinal direction may be referred to as a machine direction or MD, and the thickness of the film and the direction perpendicular to the MD can be referred to as a transverse direction or TD.

In the porous fluorine resin film, since the water-repellent and oil-repellent polymer is uniformly coated onto the outer surface as well as the inside of the structure of the porous film by the impregnation method, the fibril structure is stabilized, and thereby even when bending is applied under severe conditions, the dimensional stability is improved more than in the prior art and deterioration of the performance and the filtration characteristics of the porous film can be prevented.

In particular, the porous fluorine resin film is subjected to a free shrinking step after the heat-setting step during the preparation process, followed by coating of the water-repellent and oil-repellent polymer, thereby further increasing the dimensional stability.

The present inventors found through experiments that in order to more effectively impart water repellency and oil repellency, when a porous fluorine resin film is prepared through a predetermined process, and includes a coating layer formed on at least one surface of the porous fluorine resin layer and an outer surface of the pores and containing a specific water-repellent and oil-repellent agent, it has excellent water repellency and oil repellency, it can improve air permeability, and it can improve oil repellency characteristics on both sides, thereby completing the present invention.

In particular, it was found that, since the porous fluorine resin layer is provided by carrying out a free shrinking step according to a series of processes, a coating layer can be entirely and uniformly formed on the pore inner and outer surfaces of the porous fluorine resin layer when impregnating a solution containing a copolymer which imparts water repellency and oil repellency.

The porous fluorine resin film may refer to a patch-type fluorine resin composite porous film including a porous fluorine resin layer and a water-repellent and oil-repellent coating layer formed on the fluorine-based resin layer.

Pores are formed in the porous fluorine resin layer, and the pores are defined as void spaces in which no fluorine-based resin or other components are present. Accordingly, the outer surface of the pores means a portion surrounding the space of the pores with the fluorine-based resin or other component.

Generally, in the course of producing a fluorine-based resin film, it is known to use a method of forming a coating layer having a water-repellent and oil-repellent function in the porous fluorine resin layer or a method of impregnating a porous fluorine resin layer into a solution containing a component having a water-repellent and oil-repellent function. However, due to the high surface energy of the porous fluorine resin layer or for other reasons, there has been a limit in penetrating the component having the water-repellent and oil-repellent function into the inside of the porous fluorine resin layer.

On the other hand, according to the present invention, a specific fluorine-based water-repellent and oil-repellent agent having an oil repellency grade (AATCC-118) of 6 or higher is included in the coating solution to impart water repellency and oil repellency to the porous fluorine resin layer, like the method described hereinafter.

In addition, conventionally, simple coating is carried out for the porous fluorine resin layer subjected to general stretching and heat setting, but after the free shrinking step of the porous fluorine resin layer, it is characterized by using a method of impregnating a coating solution containing water-repellent and oil-repellent polymers.

Therefore, a coating layer having water repellency and oil repellency can be uniformly formed not only on one surface of the porous fluorine resin layer but also on the outer surface of all the pores existing in the porous fluorine resin layer.

For these reasons, the porous fluorine resin film of the embodiment may have greatly improved water repellency and oil repellency as compared with the existing fluorine resin film in which the coating layer having the water repellent and oil repellent function is formed only on the outer surface.

Further, the porous fluorine resin film of the present invention can achieve excellent oil repellency characteristics on both surfaces and edge portions even by a single impregnation coating step.

Moreover, the porous fluorine resin film can provide excellent dimensional stability even if bending occurs under severe conditions.

For the porous fluorine resin film, within a curvature radius of at least 2 mm, a change rate of the air permeability represented by the following Equation 1 before and after bending to which bending is imparted according to the method of FIG. 3 is 1% or less:

Change rate of air permeability before and after bending (%)=[(Pa—Pb)/Pa]×100    [Equation 1]

wherein, in the above Equation 1,

Pa is an air permeability value of a fluorine-based porous film measured before imparting bending, Pb is an air permeability value of a fluorine-based porous film measured after imparting bending to the fluorine-based porous film "under the condition of winding the fluorine-based porous film in a stainless steel cylinder having a diameter (R) of 4 mm to 12 mm in a state where a tension of 0.5 kgf is applied thereto, holding it for 30 seconds, then removing the tension and again spreading the fluorine-based porous film", and the air permeability value is measured by a Gurley method according to JIS P 8117.

In a preferred embodiment, a method of imparting bending to the porous fluorine resin film may be carried out according to FIG. 3.

Specifically, one end of the porous fluorine resin film is fixed so as to be in contact with a stainless steel cylinder having a diameter (R) of 4 mm or more or 4 to 12 mm, a weight is attached by a clamp to the opposite end that is not fixed, a tension of 0.5 kgf is applied thereto, and the porous film is wound around the cylinder to the end.

After maintaining the state for 30 seconds, the clamp is removed, the tension is removed, the porous film is again spread, and the air permeability value is measured. Thereby, the change rate of air permeability before and after bending of the fluorine-based porous film can be obtained.

Herein, the curvature in the present invention is a rate of change indicating a bending degree of a curved line or curved surface, and the radius of the circle may be a radius of curvature.

More preferably, the diameter R of the stainless steel cylinder may be 4 mm or 8 mm or 12 mm (curvature radius: 2 mm or 4 mm or 6 mm, respectively).

The air permeability can be measured by a Gurley method according to a standard such as JIS P 8117.

In accordance with this method, it is possible to provide a patch-type fluorine-based porous film having a change rate of air permeability of 0 to 1% expressed by Equation 1 before and after bending.

In addition, in the porous fluorine resin film, the omnidirectional shrinkage due to bending may be 1% or less, which is included in the range of the value represented by the following Equation 2.

Bending shrinkage (%)=5×exp[−0.8×curvature radius (mm)]    [Equation 2]

The shrinkage of the patch-type porous fluorine resin film may be a ratio of the MD direction to the TD direction measured after imparting bending to a fluorine-based porous film with a curvature radius of 2 mm or more.

It is preferable that the porous fluorine resin film has omnidirectional shrinkage in the machine direction (MD) and the transverse direction (TD) of 0% to 1% within a range of a curvature radius of 2 mm to 6 mm when imparting the bending.

The bending can be imparted according to the method of FIG. 3.

Further, since the porous fluorine resin layer is provided through free shrinkage, bending shrinkage can be improved.

Meanwhile, the coating layer formed on at least one surface of the porous fluorine resin layer and the outer surface of the pores includes a (co)polymer containing a repeating unit derived from a perfluoroalkyl acrylate having 1 to 10 carbon atoms. Preferably, the (co)polymer may include a (co)polymer of a perfluoroalkyl acrylate having 1 to 10 carbon atoms—an alkyl acrylate having 1 to 10 carbon atoms—vinyl chloride—a crosslinkable monomer as a water-repellent and oil-repellent agent.

Specifically, the crosslinkable monomer may mean a monomer having a hydroxyl group, a carboxyl group, an epoxy group, and an isocyanate group, or a nitrogen-containing functional group such as urethane, amine, amide, urea, and the like.

Examples thereof may include at least one selected from the group consisting of a hydroxyl group-containing monomer such as hydroxy alkyl(meth)acrylate or a hydroxyalkylene glycol(meth)acrylate; a carboxyl group-containing monomer such as (meth)acrylic acid, 2-(meth)acryloyloxyacetic acid, 3-(meth)acryloyloxypropyl acid, 4-(meth)acryloyloxybutyric acid, 4-acrylic acid dimer, itaconic acid, maleic acid, and maleic anhydride; and a nitrogen-containing monomer such as (meth)acrylamide, N-vinylpyrrolidone and N-vinylcaprolactam.

It is preferable that the material used as such a water-repellent and oil-repellent agent is diluted with a solvent to a solid matter content of about 2 to 10% by weight and is applied by impregnation coating.

The water-repellent and oil-repellent agent-containing solution may contain one or more solvents selected from the group consisting of water, alkanes having 4 to 16 carbon atoms, alcohols, carboxylic acids, ketones, ethers, and fluorine alkanes.

On the other hand, the oil repellency grade (AATCC-118) of any one surface of the porous fluorine resin composite film and another surface forming the remaining part may be 6 or higher. When the oil repellency grade becomes 6 or higher, it may contribute to the stabilization of the porous composite film structure.

Further, in the present invention, the fibril structure of the porous film can be stabilized by applying the oil-repellent coating, and thus the shrinkage of the filtration film may be reduced by about 50%.

When evaluated according to the oil repellency evaluation related standards, the oil repellent grade of the porous fluorine resin layer before formation of the coating layer is grade 4, and the oil repellency grade after formation of the coating layer is a level of grade 6 or higher, preferably grade 6 to 8, and thus it is more effective for improving the dimensional stability than in the prior art.

Preferably, the water-repellent and oil-repellent agent can be used in a state where the solid matter content is 3 to 5% by weight and is diluted with a solvent.

In addition, the porous fluorine resin film can prevent a liquid having low surface tension such as a solvent or an oil from passing through the porous composite film, and thus can achieve perfect liquid proofing performance, and can block the device inside the film from the external liquid, without blocking the pores, and so it is effective in maintaining air permeability.

In particular, as compared with the oil repellency grade of any one surface of the porous fluorine resin composite film, the oil repellency grade of another surface forming the remaining part can maintain at a high level as well. Therefore, the oil repellency grade of any one surface and the oil repellency grade of another surface forming the remaining part may have symmetry.

In addition, as the porous fluorine resin layer includes a coating layer having the water repellency and oil repellency, the contact angle with water before formation of the coating layer is 100 to 110 degrees, and the contact angle after formation of the coating layer may be 120 degrees or more.

Further, the above-mentioned coating layer is formed on at least one surface of the porous fluorine resin layer, thereby further promoting the water repellency of the porous fluorine resin layer having water repellency.

Therefore, the porous fluorine resin composite film can secure not only oil repellency but also excellent water repellency as compared with the conventional one.

Meanwhile, the porous fluorine resin layer may have a thickness of 5 to 300 μm.

When the thickness of the porous fluorine resin layer exceeds 300 μm, production efficiency is remarkably reduced. Further, when the thickness is less than 5 μm, the mechanical properties are weak, which may cause wrinkles and pinholes during the process.

In addition, although the porous fluorine resin layer has pores formed therein, these pores may have a diameter of 150 to 6000 nm.

When the pores inside the porous fluorine resin layer have a diameter within the above range, the coating liquid is impregnated and maintained in the pores to enable a stable process. When the diameter of the pores exceeds 6000 nm, the amount of the coating solution lost to the outside of the resin layer increases, so that problems such as contamination of a surface may occur. When the diameter is less than 150 nm, the permeation of the coating liquid into the resin layer is reduced, making it difficult to achieve a good oil repellent grade of both surfaces.

In addition, the porous fluorine resin layer may include a cloth obtained through a uniaxial stretching step described hereinafter, and such cloth can exhibit excellent water repellency.

At this time, the coating layer having water repellency and oil repellency penetrates evenly into the pores of the porous fluorine resin layer, thereby making it possible to exhibit excellent water repellency and oil repellency.

Specific examples of the fluorine resin contained in the fluorine resin layer are not particularly limited, but examples thereof may be one or more fluorine-based compounds selected from the group consisting of polytetrafluoroethylene (PTFE), a tetrafluoroethylene-perfluoroalkyl vinyl ether copolymer (PFA), a tetrafluoroethylene-hexafluoropropylene copolymer (FEP), an ethylene-tetrafluoroethylene copolymer resin (ETFE), a tetrafluoroethylene-chlorotrifluoroethylene copolymer (TFE/CTFE), and an ethylene-chlorotrifluoroethylene resin (ECTFE).

The fluorine-based resin such as polytetrafluoroethylene (PTFE) is a plastic having excellent heat resistance and chemical resistance, and the porous film produced from the fluorine-based resin can be widely used as a filter medium for a corrosive gas or liquid, a permeable film for electrolysis, and a battery separator. Further, it can be used to precisely filter a variety of gases and liquids used in the semiconductor industry.

Meanwhile, according another embodiment of the invention, a method for preparing the porous fluorine resin film can be provided, including the steps of: preparing a uniaxially stretched porous fluorine resin layer; heat-setting the uniaxially stretched porous fluorine resin layer; freely shrinking the heat-set porous fluorine resin layer at a temperature of at least 150° C. or higher; and impregnating the freely shrunk porous fluorine resin layer into a water-repellent and oil-repellent agent-containing solution diluted to a solid matter content of 2 to 10% by weight and drying it, wherein the water-repellent and oil-repellent agent includes a (co)polymer of a perfluoroalkyl acrylate having 1 to 10 carbon atoms—an alkyl acrylate having 1 to 10 carbon atoms—a vinyl chloride-crosslinkable monomer.

In this embodiment, in order to prepare a porous fluorine resin film having improved dimensional stability, the porous fluorine resin layer produced by uniaxial stretching is subjected to water and oil repellent coating by impregnation, wherein free shrinkage is carried out under certain conditions before water-repellent and oil-repellent coating, thereby minimizing the fibril structure change within the porous film and having a feature that the change in air permeability before and after bending under severe conditions is small.

Therefore, by improving the dimensional stability while maintaining the basic physical properties of the fluorine-based porous film, it is possible to prevent a change in the physical properties of the product generated during the cutting operation.

The method of this embodiment will be described step by step.

First, a step of preparing a uniaxially stretched porous fluorine resin layer is carried out.

The uniaxially stretched fluorine-based porous film can be produced by uniaxially stretching in the MD or TD direction by generally well-known methods.

As an example, a method including the steps of: preparing a preform using a composition containing a fluorine-based resin and a lubricant; and extruding the preform, and drying and uniaxially stretching it in the MD direction, may be provided.

The uniaxial stretching may include a step of uniaxially stretching the extruded and dried preform under a condition where the stretching ratio in the machine direction or transverse direction is 2 to 50 times.

In addition, the heat-setting step is a step performed before proceeding with the free shrinkage, which is a feature of the present invention.

Preferably, the heat-setting step for the uniaxially stretched porous fluorine resin layer may be carried out at a temperature equal to or higher than the melting point of the porous fluorine resin for 3 to 30 seconds.

In the composition containing the fluorine-based resin and the lubricant, the fluorine-based resin uses the same fluorine-based compound as those described above, and its content can be used as is well known in the art.

The lubricant is a liquid lubricant, and for example, it may further include a hydrophobic liquid lubricant which is an alkane having 5 to 12 carbon atoms and a mixture thereof, but the type thereof is not particularly limited. Specific examples of the liquid lubricant may be IsoPar, ISOL-C, ISOL-G, and the like.

The amount of the liquid lubricant used at the time of preforming is not particularly limited, and depends on the type of lubricant, molding conditions, and the like.

For example, the liquid lubricant may be used in an amount of 5 to 50 parts by weight or 10 to 40 parts by weight based on 100 parts by weight of the fluorine-based resin or fine powder thereof.

The step of extruding the preform may be carried out at a temperature of 30 to 100° C.

In the step of stretching the extruded preform, the stretching may be uniaxial stretching which is carried out by a conventional method, and a hot air method may be used.

The temperature at the step of uniaxially stretching the extruded preform may be near or below the melting point of the preform. For example, the step of uniaxially stretching the extruded preform may be carried out at a temperature of 100 to 400° C.

Meanwhile, before the step of uniaxially stretching the extruded preform, a step of sintering the preform may be further carried out.

The sintering of such a preform can be carried out, for example, at a temperature of 200 to 400° C.

The conditions for drying after extruding the preform are not particularly limited, and for example, a step of drying at a temperature of 100 to 300° C. may be carried out.

Through this drying step, the liquid lubricant can be completely removed from the extruded preform.

Through the step of drying and stretching the extruded preform, it can be produced as a single-layer porous structure in which fine pores exist uniformly.

Further, in the above embodiment, in order to improve the bending shrinkage, the freely shrinking step can be carried out before the coating step.

As the freely shrinking step proceeds, the effect of eliminating the residual stress of the porous fluorine resin layer can be exhibited, and specifically, the effect of shrinkage and rearrangement of the internal structure of fibrils or the like containing the residual stress in a natural form can be exhibited.

Accordingly, the coating layer having water repellency and oil repellency can be more uniformly distributed inside and outside the freely shrunk porous fluorine resin layer.

In the preparation method of this embodiment, the step of freely shrinking the heat-set porous fluorine resin layer at a temperature of at least 150° C. may be carried out.

Preferably, the freely shrinking step may include a step of performing the free shrinkage of the heat-set porous fluorine resin layer at 150 to 250° C. for 3 to 30 minutes. When the free shrinkage condition is lower than the above range, it does not achieve sufficient stabilization and thus shows a high shrinkage rate.

When the free shrinkage condition is higher than the above range, there is a problem that the excellent physical properties of the porous film are deteriorated.

Further, in order to stabilize the crystal structure of the fluorine-based resin, after the free shrinking step, the method may further include a step of allowing it to stand at room temperature for 3 to 30 minutes.

After the above step, a step of impregnating and coating the freely shrunk porous fluorine resin layer with a water-repellent and oil-repellent agent-containing solution is carried out.

That is, in the preparation method of the embodiment of the invention, when forming a coating layer for imparting water repellency and oil repellency, a method of impregnating the porous film after free shrinkage in the above solution is used instead of performing a simple external coating as in the prior art. Therefore, a coating layer having water repellency and oil repellency on the outer surface as well as the inner pores of the porous film can be formed more effectively than in the prior art.

Preferably, the water-repellent and oil-repellent agent includes a (co)polymer containing a repeating unit derived from a perfluoroalkyl acrylate having 1 to 10 carbon atoms.

The water-repellent and oil-repellent agent-containing solution used for impregnating the porous film with the water-repellent and oil-repellent agent may be prepared by adding a water-repellent and oil-repellent agent to the solvent so as to have a certain solid matter content, and can thusly be used.

According to one embodiment, the water-repellent and oil-repellent agent-containing solution may be used in a state of being diluted to a solid matter content of 2 to 10% by weight or 3 to 5% by weight.

When the solid matter content is less than 2% by weight, sufficient oil repellency cannot be realized. When the solid matter content exceeds 10% by weight, there is a problem that the physical properties of the porous film such as clogging are deteriorated.

The type of the solvent used for preparing the water-repellent and oil-repellent agent-containing solution is not particularly limited, but examples thereof include at least one solvent selected from the group consisting of water, an alkane having 4 to 16 carbon atoms, an alcohol, a carboxylic acid, a ketone, an ether, and a fluorine-based alkane having 5 to 12 carbon atoms.

Preferably, the alcohol may be an alcohol having 1 to 8 carbon atoms, and specifically, it may be methanol, ethanol, n-propanol, isopropanol, 1-butanol, or 1-hexanol.

Therefore, in the preparation method of this embodiment, a step of impregnating the freely shrunk porous fluorine resin layer with a water-repellent and oil-repellent agent-containing solution diluted to a solid matter content of 2 to 10% by weight may be carried out.

In the step of impregnating the freely shrunk porous fluorine resin layer with a water-repellent and oil-repellent agent-containing solution, the porous film may be put into the water-repellent and oil-repellent agent-containing solution to such an extent that the porous fluorine resin layer after completion of the free shrinkage is sufficiently impregnated, and then the impregnation coating can be carried out for a predetermined period of time.

Preferably, the step of impregnating the freely shrunk porous fluorine resin layer may be carried out for 10 seconds to 60 seconds, or 20 seconds to 40 seconds.

After the above steps, a step of drying the fluorine-based porous film impregnated in the solution is carried out.

The drying step is not particularly limited, but is preferably carried out at a temperature of 120 to 200° C. for 1 to 10 minutes.

Through this process, in the preparation method of the embodiment of the invention, the porous fluorine resin film can be prepared into a patch-type sheet.

Further, the porous fluorine resin film may have porosity of 40 to 90%, a maximum pore size of 300 nm to 4000 nm, and a density of 0.10 to 1.30 g/cm$^3$.

Further, the porous film of the present invention may have water pressure resistance of 0.01 to 0.3 MPa under a condition of air permeability of 1 to 30 s/100 cc.

The average pore size of the porous film may be 150 nm to 1500 nm, and the maximum pore size may be 300 nm to 4000 nm.

Therefore, according to another embodiment of the invention, an automotive vent filter including the above-mentioned porous fluorine resin film is provided.

In forming the porous fluorine resin film, the fibril structure inside the film is stabilized due to the free shrinkage and the water-repellent and oil-repellent agent coating, and thereby an excellent product which is excellent in dimensional stability even when bending is applied under severe conditions, and has almost no change in air permeability before and after bending, can be provided.

As the vent filter includes the porous fluorine resin film of the present invention described above, it can be provided and used according to methods that are well known in the art.

Advantageous Effects

According to the present invention, a porous fluorine resin film in which a generally-prepared uniaxially stretched porous fluorine resin film that has undergone a heat setting step is freely shrunk under certain conditions, and then impregnation coating of a water-repellent and oil-repellent agent is carried out, and therefore, even when severe bending is applied to a final product, both MD and TO directions can have shrinkage of 1% or less, thereby improved dimensional stability, and a method for preparing the same, can be provided.

That is, in the present invention, the fibril structure is stabilized through the impregnation coating of the water-repellent and oil-repellent polymer, and the free shrinkage proceeds before the impregnation coating of the water-repellent and oil-repellent polymer, and thereby a product with little change in air permeability before and after bending, thus having excellent physical properties particularly improved dimensional stability, can be provided.

Accordingly, the present invention can easily provide an automotive vent filter including a porous fluorine resin film having excellent air permeability and improved dimensional stability.

BRIEF DESCRIPTION OF THE DRAWINGS

FIG. 1 is a simplified illustration of a process for preparing the porous fluorine resin films of Comparative Examples 1 to 3 and Examples 1 to 3.

FIG. 2 shows an electron microscope photograph (SEM) of a PTFE filtration film used for producing the porous fluorine resin films of Examples 1 to 3 of the present invention ((a), 1K magnification, (b): 5K magnification)

FIG. 3 shows the radius of curvature after bending the porous fluorine resin film of Comparative Examples 1 to 3 and Examples 1 to 3.

FIG. 4 shows a comparison of changes in shrinkage ratio of the porous fluorine resin films of Comparative Examples 1 to 3 and Examples 1 to 3 according to the average radius of curvature.

Detailed Description of the Embodiments

The invention will be described in more detail by way of examples provided below.

However, the following examples are illustrative of the present invention, and the scope of the present invention is not limited to or by the examples.

Examples 1 to 3: Preparation of Water-Repellent and Oil-Repellent Coated PTFE Porous Film A uniaxially stretched porous fluorine resin layer (uniaxially stretched PTFE filtration film) was produced through Preform—Extrusion—Calendering & Drying—MD Stretching—Heat Setting processes.

That is, 22 parts by weight of a liquid lubricant (trade name: "Isopar H", Exxon Co.) was mixed with 100 parts by weight of polytetrafluoroethylene powder (CD145E, AGC) to prepare a single layer preform.

Then, the single layer preform was extruded at a temperature of 50° C. at a rate of 50 mm/min to prepare a sheet having a thickness of about 300 µm.

The sheet thus prepared was heated at a temperature of about 200° C. to completely dry and remove the liquid lubricant.

After the drying step, the preform was uniaxially stretched under the conditions shown in Table 1 below.

The cloth means a uniaxially stretched porous fluorine resin layer. The bending shrinkage of the cloth was the maximum MD 8%/TD 0% level.

In addition, the oil repellency grade of the cloth was grade 4 level.

TABLE 1

| Drying · curing condition | Initial cloth |
| --- | --- |
| Thickness, µm | 207 |
| Porosity, % | 67 |
| Pore size mean/max, nm | 315/664 |
| Gurley value, s | ~50 |
| Water pressure resistance, MPa | 0.15 |

Next, as shown in FIG. 1, the uniaxially stretched porous fluorine resin layer subjected to heat setting was freely shrunk at 150° C. for 30 minutes and left at room temperature for 10 minutes.

At this time, the heat setting was carried out for 10 seconds at 350° C., which is equal to or higher than the melting point of the polytetrafluoroethylene powder.

A water-repellent and oil-repellent agent (AG-E 550D, AGC from Asahi Glass Co., Ltd.) including a (co)polymer containing a repeating unit derived from a perfluoroalkyl acrylate having 1 to 10 carbon atoms was dissolved using a solvent (ethanol) so that the solid matter content was 4.2% by weight.

Next, the porous fluorine resin layer subjected to the free shrinkage was impregnated with the water-repellent and oil-repellent agent-containing solution for 30 seconds, and the water-repellent and oil-repellent agent was entirely coated onto the inner and outer surfaces of the porous fluorine resin layer to prepare a porous fluorine resin film of a patch type (water-repellent and oil-repellent coated PTFE porous film).

In this case, Examples 1 to 3 were classified as follows.

Example 1: obtained after bending a porous fluorine resin film subjected to a freely shrinking step with a radius of curvature of 2 mm.

Example 2: obtained after bending a porous fluorine resin film subjected to a freely shrinking step with a radius of curvature of 4 mm.

Example 3: obtained after bending a porous fluorine resin film subjected to a freely shrinking step with a radius of curvature of 6 mm.

Comparative Examples 1 to 3: Preparation of PTFE Porous Film

A PTFE porous film coated with a water repellent and an oil repellent was prepared in the same manner as in Example 1, except that the freely shrinking step was not carried out.

At this time, Comparative Examples 1 to 3 were classified as follows.

Comparative Example 1: obtained after bending a porous fluorine resin film not subjected to a freely shrinking step with a radius of curvature of 2 mm.

Comparative Example 2: obtained after bending a porous fluorine resin film not subjected to a freely shrinking step with a radius of curvature of 4 mm.

Comparative Example 3: obtained after bending a porous fluorine resin film not subjected to a freely shrinking step with a radius of curvature of 6 mm.

Experimental Example

Bending was imparted to the porous films of the examples and comparative examples under the following conditions, and then the shrinkage and the air permeability before and after bending were measured. The results are shown in Table 2 below.

In addition, the air permeability can be measured by a Gurley method according to a standard such as JIS P 8117.

That is, a Gurley number (unit: s or s/100 ml), which is the time required to pass 100 ml of air, was evaluated as the air permeability.

Gurley number was determined by using a conventional Gurley Type Densometer based on the JIS P8117 standard.

FIG. 3 shows the radius of curvature after imparting bending to the porous fluorine resin film of Comparative Examples 1 to 3 and Examples 1 to 3.

FIG. 4 shows a comparison of shrinkages according to the average radius of curvature of the porous fluorine resin films of Comparative Examples 1 to 3 and Examples 1 to 3.

TABLE 2

| Category | Comparative Example | | | Example | | |
| --- | --- | --- | --- | --- | --- | --- |
| | 1 | 2 | 3 | 1 | 2 | 3 |
| Curvature radius, mm | 2 | 4 | 6 | 2 | 4 | 6 |
| Size, mm (MD × TD) | 49.0 × 50.0 | 49.5 × 50.0 | 49.8 × 50.0 | 49.5 × 50.0 | 49.9 × 50.0 | 50.0 × 50.0 |
| Shrinkage, % (MD/TD) | 2/0 | 1/0 | 0.4/0 | 1/0 | 0.2/0 | 0/0 |
| Air permeability before and after bending, Gurley, s/100 ml | 18→17 | 21→20 | 19→17 | 15→15 | 14→14 | 15→15 |

Specifically, as shown in FIG. 3, the bending was imparted to the porous film, and the air permeability within a radius of curvature of 2 mm or more was measured.

The change rate of air permeability of each porous film was measured according to the following Equation 1.

Change rate of air permeability before and after bending (%)=[(Pa−Pb)/Pa]×100  [Equation 1]

(In the above Equation 1,

Pa is an air permeability value of a fluorine-based porous film measured before imparting bending, Pb is an air permeability value of a fluorine-based porous film measured after imparting bending to the fluorine-based porous film).

Further, the omnidirectional shrinkage due to bending for the porous fluorine resin film was calculated according to the following Equation 2.

Bending shrinkage (%)=5×exp[−0.8×curvature radius (mm)]  [Equation 2]

Method of Imparting Bending

As shown in FIG. 3, one end of the porous fluorine resin film was fixed so as to be in contact with a stainless steel cylinder having a diameter (R) of 4 to 12 mm, a weight was attached by a clamp to the opposite end that was not fixed, a tension of 0.5 kgf was applied thereto, and the porous film was wound around the cylinder to the end.

After maintaining the state for 30 seconds, the clamp was removed, the tension was removed, the porous film was again spread, and the air permeability was measured.

As can be seen in Table 2 and FIG. 4, in the porous fluorine resin film (PTFE porous filtration film) products prepared in Examples 1 to 3, the shrinkage due to bending was reduced by 50% or more as compared with Comparative Examples 1 to 3.

In particular, in Examples 1 to 3, since the internal structure of the porous film was not changed after bending, the change in air permeability was small.

On the other hand, in Comparative Examples 1 to 3, the change rate of air permeability of the porous film after bending was about 5 to 10%, and as the air permeability was changed, the physical properties were changed.

In addition, in Comparative Examples 2 and 3, even if the shrinkage ratio was 1% or less, the change rate of air permeability was large, which was not preferable to apply to products.

The invention claimed is:

1. A porous fluorine resin film comprising:
   a porous fluorine resin layer having pores formed therein; and
   a coating layer formed on at least one surface of the porous fluorine resin layer and an outer surface of the pores,
   wherein, the coating layer has water repellency and oil repellency and includes a (co)polymer of a perfluoroalkyl acrylate having 1 to 10 carbon atoms, an alkyl acrylate having 1 to 10 carbon atoms, vinyl chloride and a crosslinkable monomer, and
   wherein, the porous fluorine resin film has a change rate of air permeability of 1% of less before and after bending thereof within a curvature radius of at least 2 mm as calculated by Equation 1:

Change rate of air permeability before and after bending (%)=[$(Pa-Pb)/Pa$]×100    [Equation 1]

wherein, in the above Equation 1,

Pa is an air permeability value of the porous fluorine resin film measured before bending thereof, Pb is an air permeability value of the porous fluorine resin film measured after bending thereof, wherein bending is applied by winding the porous fluorine resin film around a stainless steel cylinder having a diameter (R) of 4 mm to 12 mm to which a tension of 0.5 kgf is applied, holding the wound film for 30 seconds, removing the tension and spreading the film, and wherein, the air permeability value is measured by a Gurley method according to JIS P 8117.

2. The porous fluorine resin film of claim 1, wherein an omnidirectional bending shrinkage due to the bending of the film is 1% or less as calculated by Equation 2:

Bending shrinkage (%)=5×exp[−0.8×curvature radius (mm)]    [Equation 2]

3. The porous fluorine resin film of claim 2, wherein each of the omnidirectional Bending shrinkage in the machine direction (MD) and omnidirectional Bending shrinkage in the transverse direction (TD) is 0% to 1% within a range of a curvature radius of 2 mm to 6 mm.

4. The porous fluorine resin film of claim 2, wherein the omnidirectional shrinkage due to the bending is a ratio of the omnidirectional Bending shrinkage in the MD direction to the omnidirectional Bending shrinkage in the TD direction.

5. The porous fluorine resin film of claim 1, wherein the crosslinkable monomer is a monomer having a hydroxyl group, a carboxyl group, an epoxy group, and an isocyanate group, urethane, amine, amide, or urea.

6. The porous fluorine resin film of claim 1, wherein the coating layer is formed on more than one surface of the porous fluorine resin layer and any one surface of the porous fluorine resin film and another surface forming the remaining part of the film have an oil repellency grade (AATCC-118) of 6 or higher, respectively.

7. The porous fluorine resin film of claim 6, wherein the oil repellency grade of any one surface and the oil repellency grade of another surface forming the remaining part have symmetry with each other.

8. The porous fluorine resin film of claim 1, wherein it has a porosity of 40 to 90%, a maximum pore size of 300 nm to 4000 nm, and a density of 0.10 to 1.30 g/cm$^3$.

9. The porous fluorine resin film of claim 1, wherein the porous fluorine resin layer is provided through free shrinkage.

10. The porous fluorine resin film of claim 1, wherein the fluorine resin layer includes one or more fluorine-based compounds selected from the group consisting of polytetrafluoroethylene (PTFE), a tetrafluoroethylene-perfluoroalkyl vinyl ether copolymer (PFA), a tetrafluoroethylene-hexafluoropropylene copolymer (FEP), an ethylene-tetrafluoroethylene copolymer resin (ETFE), a tetrafluoroethylene-chlorotrifluoroethylene copolymer (TFE/CTFE), and an ethylene-chlorotrifluoroethylene resin (ECTFE).

11. A method for preparing the porous fluorine resin film of claim 1, comprising the steps of: uniaxial stretching of a porous fluorine resin layer;

heat-setting of the uniaxially stretched porous fluorine resin layer;

free shrinking of the heat-set porous fluorine resin layer at a temperature of at least 150° C. or higher; and impregnating of the free shrunk porous fluorine resin layer into a water-repellent and oil-repellent agent-containing solution diluted to have a solid content of 2 to 10% by weight to produce the porous fluorine resin film, wherein the water-repellent and oil-repellent agent includes a (co)polymer of a perfluoroalkyl acrylate having 1 to 10 carbon atoms an alkyl acrylate having 1 to 10 carbon atoms vinyl chloride and a crosslinkable monomer.

12. The method for preparing the porous fluorine resin film of claim 11, wherein the free shrinking step includes a step of performing the free shrinking of the heat-set porous fluorine resin layer at 150 to 250° C. for 3 to 30 minutes.

13. The method for preparing the porous fluorine resin film of claim 11, further comprising a step of allowing the porous fluorine resin layer to stand room temperature for 3 to 30 minutes, after the free shrinking step.

14. The method for preparing the porous fluorine resin film of claim 11, wherein the heat-setting step is carried out for the uniaxially stretched porous fluorine resin layer at a temperature equal to or higher than the melting point of a fluorine resin for 3 to 30 seconds.

15. The method for preparing the porous fluorine resin film of claim 11, wherein the water-repellent and oil-repellent agent-containing solution contains one or more solvents selected from the group consisting of water, alkanes having 4 to 16 carbon atoms, alcohols, carboxylic acids, ketones, ethers, and fluorine alkanes having 5 to 12 carbon atoms.

16. The method for preparing the porous fluorine resin film of claim 11, wherein the porous fluorine resin layer in the step of uniaxial stretching is prepared by a method comprising the steps of:

preparing a preform using a composition containing a fluorine resin and a lubricant; and extruding the preform, and drying and uniaxially stretching the extruded preform in the MD direction.

17. An automotive vent filter comprising the porous fluorine resin film of claim 1.

* * * * *